(12) United States Patent
Kim et al.

(10) Patent No.: US 8,852,798 B2
(45) Date of Patent: Oct. 7, 2014

(54) RECHARGEABLE BATTERY INCLUDING ELASTIC MEMBER COMPRISING TAPERING WALL

(75) Inventors: Duk-Jung Kim, Yongin-si (KR); Joong-Heon Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 445 days.

(21) Appl. No.: 13/205,113

(22) Filed: Aug. 8, 2011

(65) Prior Publication Data

US 2012/0107678 A1 May 3, 2012

Related U.S. Application Data

(60) Provisional application No. 61/409,728, filed on Nov. 3, 2010.

(51) Int. Cl.
| | |
|---|---|
| *H01M 2/10* | (2006.01) |
| *H01M 2/02* | (2006.01) |
| *H01M 2/14* | (2006.01) |
| *H01M 10/02* | (2006.01) |
| *H01M 2/18* | (2006.01) |
| *H01M 10/04* | (2006.01) |
| *H01M 10/0587* | (2010.01) |
| *H01M 10/0525* | (2010.01) |

(52) U.S. Cl.
CPC *H01M 2/18* (2013.01); *H01M 2/14* (2013.01); *Y02T 10/7011* (2013.01); *H01M 10/02* (2013.01); *H01M 10/0587* (2013.01); *Y02E 60/12* (2013.01); *H01M 10/0525* (2013.01); *H01M 10/04* (2013.01)
USPC .......................................... 429/186; 429/163

(58) Field of Classification Search
USPC .......... 429/186, 176, 94, 136, 129, 161, 181, 429/163
See application file for complete search history.

(56) References Cited

U.S. PATENT DOCUMENTS

| 1,663,887 A * | 3/1928 | Lyndon ..................... 429/186 |
| 3,597,282 A * | 8/1971 | Farley, Jr. .................. 136/208 |
| 6,232,015 B1* | 5/2001 | Wyser ........................ 429/176 |
| 6,899,975 B2 | 5/2005 | Watanabe et al. |
| 2003/0162091 A1* | 8/2003 | Watanabe et al. ............. 429/156 |
| 2006/0024568 A1* | 2/2006 | Lee ............................ 429/130 |

(Continued)

FOREIGN PATENT DOCUMENTS

| JP | 2000-090903 A | 3/2000 |
| JP | 2003-257391 A | 9/2003 |

(Continued)

OTHER PUBLICATIONS

European Search Report in EP 11185371.9-2119, dated Mar. 29, 2012 (Kim, et al.).

(Continued)

*Primary Examiner* — Kenneth Douyette
(74) *Attorney, Agent, or Firm* — Lee & Morse, P.C.

(57) ABSTRACT

A rechargeable battery including an electrode assembly; a case accommodating the electrode assembly; and an elastic member between the case and an outer surface of the electrode assembly, wherein the elastic member includes a tapering wall defining a central open area having an axis, the tapering wall having an inclined disposition relative to the axis of the central open area.

18 Claims, 13 Drawing Sheets

(56) References Cited

U.S. PATENT DOCUMENTS

| | | | |
|---|---|---|---|
| 2006/0134512 A1* | 6/2006 | Woo | 429/94 |
| 2009/0280406 A1 | 11/2009 | Kozuki | |
| 2010/0151317 A1 | 6/2010 | Kim et al. | |
| 2010/0167120 A1 | 7/2010 | Han et al. | |

FOREIGN PATENT DOCUMENTS

| | | |
|---|---|---|
| JP | 2005-197179 A | 7/2005 |
| JP | 2006-172856 A | 6/2006 |
| KR | 20-1999-0031053 U | 7/1999 |
| KR | 10 2009-0129621 A | 12/2009 |
| KR | 10 2010-0068080 A | 6/2010 |

OTHER PUBLICATIONS

Korean Notice of Allowance in KR 10-2011-0090370, dated Oct. 31, 2013 (Kim, et al.).

* cited by examiner

RECHARGEABLE BATTERY INCLUDING ELASTIC MEMBER COMPRISING TAPERING WALL

CROSS-REFERENCE TO RELATED APPLICATION

The present application claims priority under 35 U.S.C. §119(e) to U.S. Provisional Application No. 61/409,728, filed on Nov. 3, 2010, and entitled: "Rechargeable Battery," which is incorporated herein by reference in its entirety.

BACKGROUND

1. Field

Embodiments relate to a rechargeable battery.

2. Description of the Related Art

A rechargeable battery, unlike a primary battery, may be repeatedly charged and discharged. A small capacity rechargeable battery may be used in small and portable electronic devices, e.g., a mobile phone, a laptop computer, and/or a camcorder. A large capacity rechargeable battery may be used as a power source for driving the motor of a hybrid vehicle.

A high power rechargeable battery using a non-aqueous electrolyte of a high energy density is being developed. The high power rechargeable battery may include a plurality of rechargeable batteries coupled in series, and may be used to drive the motor of a device requiring high power, e.g., an electric vehicle.

The rechargeable battery may include an electrode assembly (having a positive electrode and a negative electrode provided on respective sides of a separator), a case accommodating the electrode assembly, a cap plate closing and sealing an opening of the case, and electrode terminals penetrating a cap plate and installed therein and electrically connected to the electrode assembly.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly; a case accommodating the electrode assembly; and an elastic member between the case and an outer surface of the electrode assembly, wherein the elastic member includes a tapering wall defining a central open area having an axis, the tapering wall having an inclined disposition relative to the axis of the central open area.

The elastic member may have a loop structure surrounding the central open area.

The loop structure may be a closed loop structure.

The central open area may have a prismatic shape with rounded corners.

The central open area may have an oblong shape with rounded ends and with outwardly extending, finger-like projections.

The central open area may have a rounded shape.

The central open area may be defined by edges of the wall, the edges of the wall including a pair of curved sections having concavities facing one another, and a pair of straight sections connecting ends of the curved sections.

The central open area may be defined by edges of the wall, the edges of the wall including four quarter circle sections, and straight sections connecting ends of the quarter circle sections.

The rechargeable battery may include a plurality of the elastic members between the outer surface of the electrode assembly and the case.

The plurality of elastic members may include an inside elastic member and an outside elastic member, the inside elastic member being between the outside elastic member and the electrode assembly, the outside elastic member being between the case and the inside elastic member, and the plurality of elastic members being stacked in a surface contact configuration such that the tapering walls thereof taper in the same direction.

The plurality of elastic members may include an inside elastic member and an outside elastic member, the inside elastic member being between the outside elastic member and the electrode assembly, the outside elastic member being between the case and the inside elastic member, and the plurality of elastic members being stacked in a line contact configuration such that the tapering walls thereof taper in opposite directions.

The elastic member may be elastically biased toward the electrode assembly.

The elastic member may have a truncated conical shape formed by the tapering wall.

The wall may have one axial end defining a first circumference and another axial end defining a second circumference, the first circumference being different from the second circumference.

The wall may taper inwardly from the case to the electrode assembly.

The tapering wall may be movable between relatively relaxed and relatively compressed positions, a degree of incline of the tapering wall relative to the axis of the central open area being greater in the relatively compressed positing than in the relatively relaxed position.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
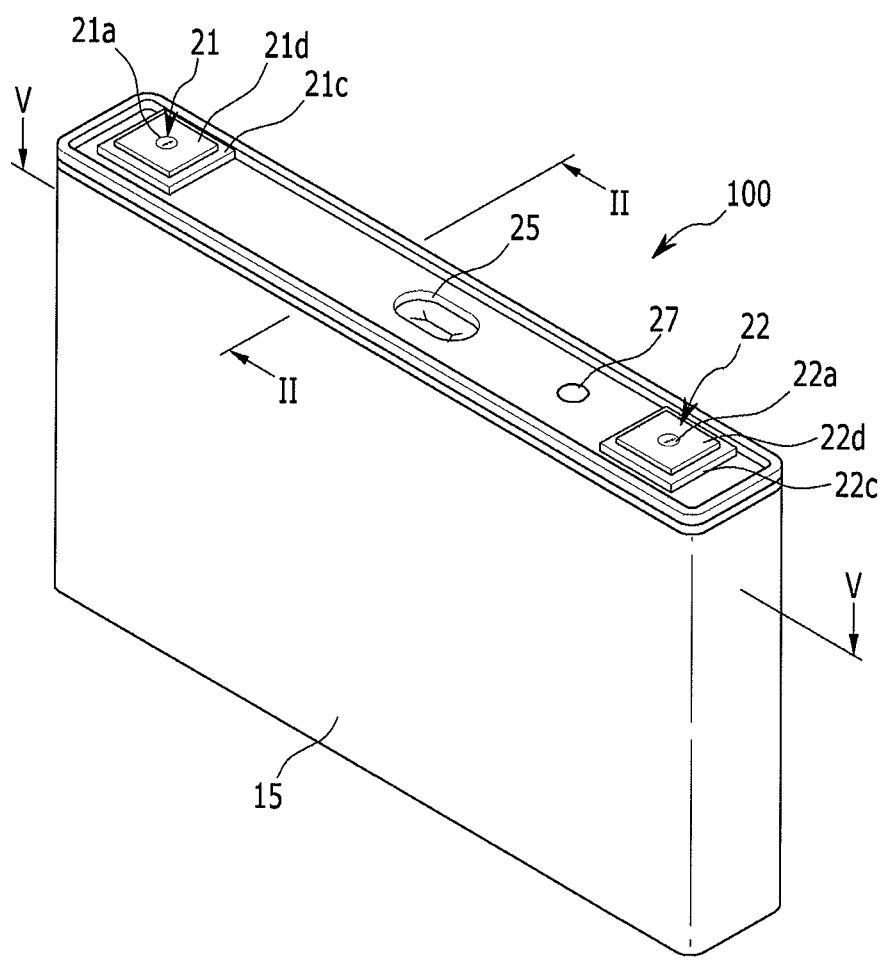
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
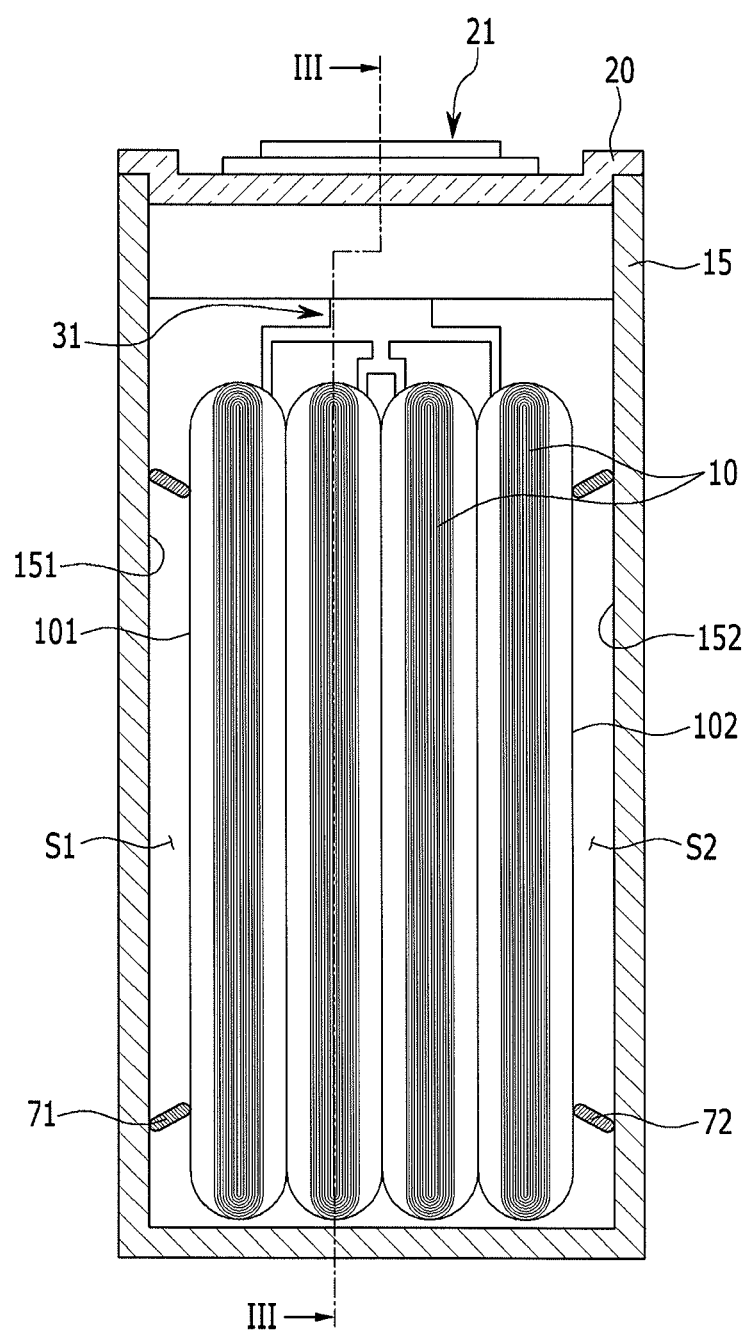
FIG. 2 illustrates a cross-sectional view taken along line II-II of FIG. 1.
Figure 3:
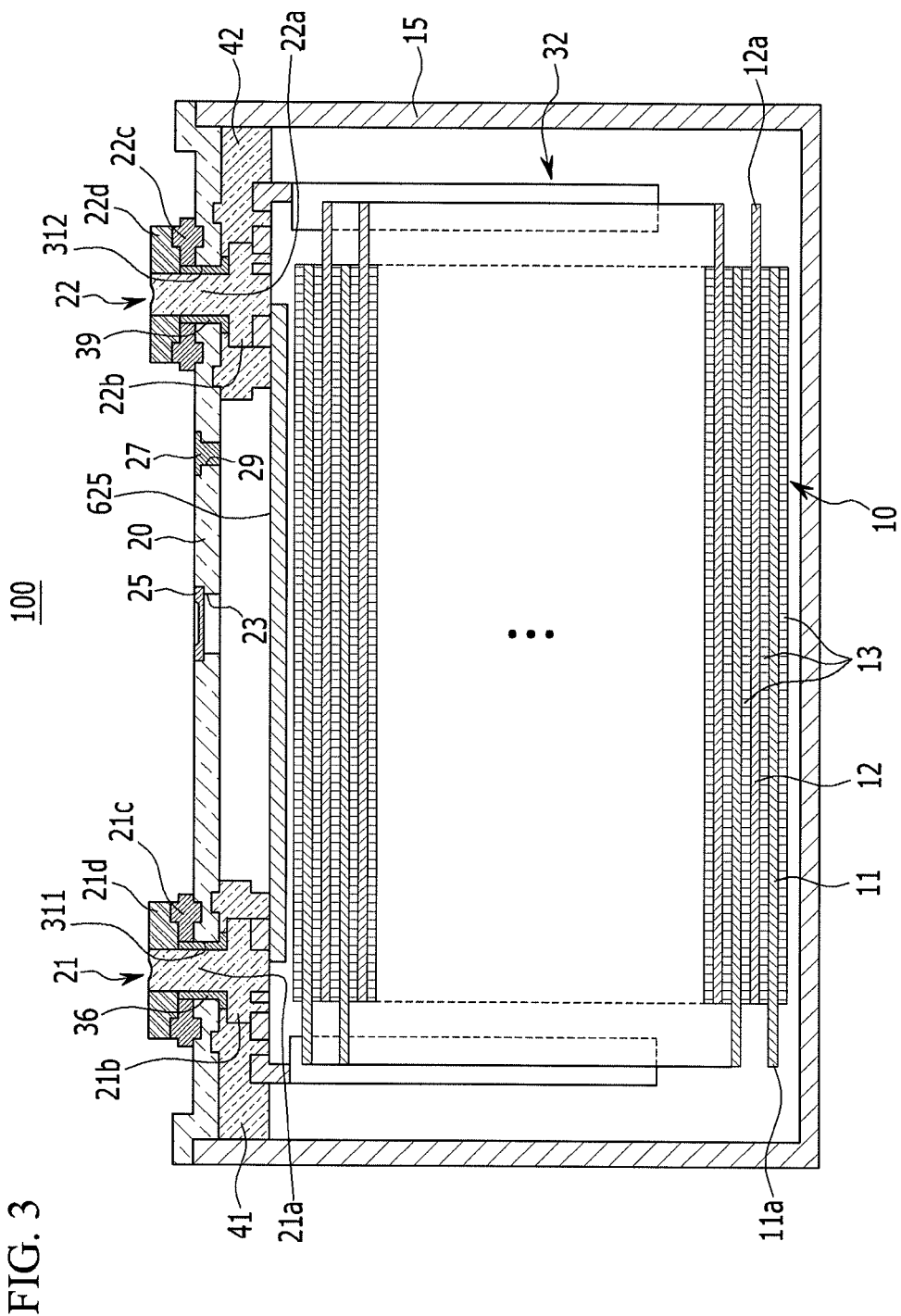
FIG. 3 illustrates a cross-sectional view taken along line III-III of FIG. 2.

FIG. 1 illustrates a perspective view of a rechargeable battery according to an embodiment. FIG. 2 illustrates a cross-sectional view taken along line II-II of FIG. 1. FIG. 3 is a cross-sectional view taken along line of FIG. 2.

Referring to FIGS. 1 to 3, a rechargeable battery 100 according to the present embodiment may include an electrode assembly 10, a case 15 accommodating the electrode assembly 10, a cap plate 20 connected to an opening of the case 15, first and second electrode terminals 21 and 22 disposed in the cap plate 20, and elastic members 71 and 72 between the case 15 and the electrode assembly 10. In an implementation, there may be one or more electrode assemblies 10.

The rechargeable battery 100 according to the present embodiment may be a lithium ion rechargeable battery having a rectangular shape. However, the embodiments are not limited thereto, and ma be applied to various forms of rechargeable batteries, e.g., a lithium polymer rechargeable battery and a cylindrical rechargeable battery.

Referring to FIG. 3, the electrode assembly 10 may include a negative electrode 11 and a positive electrode 12 on respective sides of a separator 13 (e.g., an insulator). The negative electrode 11, the separator 13, and the positive electrode 12 may be wound in a jelly roll structure.

Although not illustrated, in an implementation, the electrode assembly may be assembled by laminating the negative electrode and the positive electrode, formed of a single plate, with the separator interposed therebetween, or may be assembled by zigzag-folding the negative electrode, the separator, and the positive electrode and laminating them.

Each of the negative electrode 11 and the positive electrode 12 may include a coating portion in which an active material is coated on the current collector (e.g., a metal plate) and uncoated portions 11a and 12a formed of exposed portions of the current collectors (e.g., portions on which an active material is not coated).

The uncoated portion 11a of the negative electrode 11 may be formed at one end of the negative electrode 11 along the wound negative electrode 11. The uncoated portion 12a of the positive electrode 12 may be formed at another end of the positive electrode 12 along the wound positive electrode 12. Accordingly, the uncoated portions 11a and 12a may be respectively disposed at opposite ends of the electrode assembly 10.

In an implementation, a plurality of electrode assemblies 10 may be included. Accordingly, in the electrode assemblies 10, the negative electrodes 11 may be electrically connected through a negative electrode current collection lead tab 31; and the positive electrodes 12 may be electrically connected through a positive electrode current collection lead tab 32. Although not illustrated, the embodiments may also be applied to a rechargeable battery in which the number of electrode assembly is one.

The case 15 may have an approximately cuboid or hexahedral shape so that a space for housing the electrode assembly 10 and an electrolyte solution may be defined. An opening for connecting external and internal spaces may be formed on one side of the cuboid structure. The electrode assembly 10 may be inserted into the case 15 through the opening.

The cap plate 20 may be made of a thin sheet material and may be disposed in the opening of the case 15. The cap plate 20 may close and seal the case 15. The cap plate 20 may further include an electrolyte solution injection port 29 and a vent hole 24. After the electrolyte solution is injected, the electrolyte solution injection port 29 may be sealed with a sealing plug 27.

When an internal pressure of the rechargeable battery 100 exceeds a predetermined pressure, the pressure may be discharged through the vent hole 24, which is closed and sealed by a vent plate 25 during normal operations. The first and second electrode terminals 21 and 22 may penetrate the cap plate 20 and may be electrically connected to the electrode assembly 10. For example, the first and second electrode terminals 21 and 22 may be electrically connected to the negative electrode 11 and the positive electrode 12 of the electrode assembly 10, respectively. Accordingly, the electrode assembly 10 may be electrically connected outside of the case 15 through the first and second electrode terminals 21 and 22.

The first and second electrode terminals 21 and 22 may include respective pole units 21a and 22a (disposed in terminal holes 311 and 312 formed in the cap plate 20), respective flanges 21b and 22b (formed in the pole units 21a and 22a inside the case 15), and terminal plates 21d and 22d disposed outside of the case 15 and connected to the pole units 21a and 22a.

The terminal plates 21d and 22d may be connected to the terminal plates (not shown) of neighboring rechargeable batteries through bus bars (not shown) so that the rechargeable batteries 100 may be coupled together in series or in parallel.

On a side of the first electrode terminal 21, a negative electrode gasket 36 may be disposed between the pole unit 21a of the first electrode terminal 21 and the inside of the terminal hole 311 of the cap plate 20 and may seal a space between the pole unit 21a of the first electrode terminal 21 and the terminal hole 311 of the cap plate 20. The negative electrode gasket 36 may further extend between the flange 21b and the cap plate 20 and may seal a space between the flange 21b and the cap plate 20. For example, the first electrode terminal 21 may be disposed in the cap plate 20. Thus, the negative electrode gasket 36 may prevent the electrolyte solution from leaking through the terminal hole 311.

On a side of the second electrode terminal 22, a positive electrode gasket 39 may be disposed between the pole unit 22a of the second electrode terminal 22 and the inside of the terminal hole 312 of the cap plate 20 and may seal the space between the pole unit 22a of the second electrode terminal 22 and the terminal hole 312 of the cap plate 20. The positive electrode gasket 39 may further extend between the flange 22b and the cap plate 20 and may seal the space between the flange 22b and the cap plate 20.

For example, the second electrode terminal 22 may be disposed in the cap plate 20. Thus, the positive electrode gasket 39 may prevent the electrolyte solution from leaking through the terminal hole 312.

Further, the cap plate 21c and the terminal plate 21 may be insulated with insulating members 21c and 22c interposed therebetween.

The negative electrode and positive electrode current collection lead tabs 31 and 32 may electrically connect the first and second electrode terminals 21 and 22 to the negative and positive electrodes 11 and 12 of the electrode assembly 10, respectively. For example, the negative electrode and positive electrode current collection lead tabs 31 and 32 may be connected to bottoms of the pole units 21a and 22a and the bottoms may be welded thereto. Thus, the negative electrode and positive electrode current collection lead tabs 31 and 32 may be supported by the flanges 21b and 22b and may also be connected to the bottoms of the pole units 21a and 22a.

The negative electrode and positive electrode current collection lead tabs 31 and 32 may have the same structure. Thus, a repeated detailed description of the positive electrode current collection lead tab 32 is omitted; and a structure in which the negative electrode current collection lead tab 31 is connected to four electrode assemblies 10 is described as an example.

Figure 4:
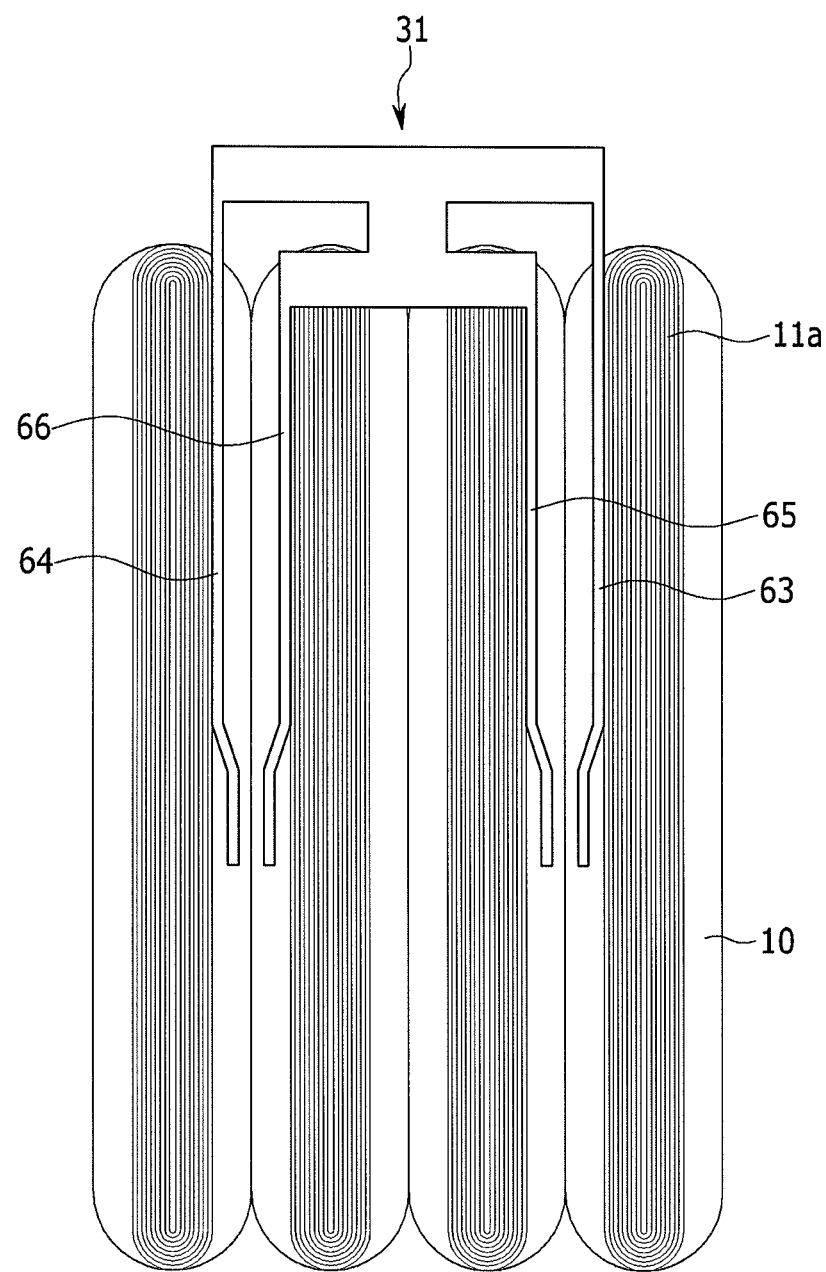
FIG. 4 illustrates a lateral view showing a state in which electrode assemblies and a negative electrode current collection lead tab are connected in the rechargeable battery of FIG. 1.

FIG. 4 illustrates a lateral view showing a state in which electrode assemblies and a negative electrode current collector lead tab are connected in the rechargeable battery of FIG. 1. Referring to FIG. 4, the negative electrode current collection lead tab 31 may include first, second, third, and fourth electrode assembly joining units 63, 64, 65, and 66 connected to the first electrode terminal 21 and inserted between the electrode assemblies 10.

The four electrode assemblies 10 may overlap with each other; and the uncoated portions 11a and 12a may be respectively formed at opposite ends of the four electrode assemblies 10. In FIG. 4, the uncoated portions 11a of the negative electrode 11 may have a smaller thickness than a coating portion on which an active material is coated. Thus, a space may be formed between the uncoated portions 11a. The first, second, third, and fourth electrode assembly joining units 63, 64, 65, and 66 may be inserted and disposed in the space between the uncoated portions 11a.

The first, second, third, and fourth electrode assembly joining units 63, 64, 65, and 66 may be bent and formed in parallel, disposed in parallel with the uncoated portions 11a of the negative electrode 11, and bonded to the uncoated portions 11a by ultrasonic welding.

Referring to FIG. 3, negative electrode and positive electrode insulating members 41 and 42 may be disposed between the respective negative electrode and positive electrode current collection lead tabs 31 and 32 and the cap plate 20 and may electrically insulate the respective negative electrode and positive electrode current collection lead tabs 31 and 32 and the cap plate 20.

Figure 5:
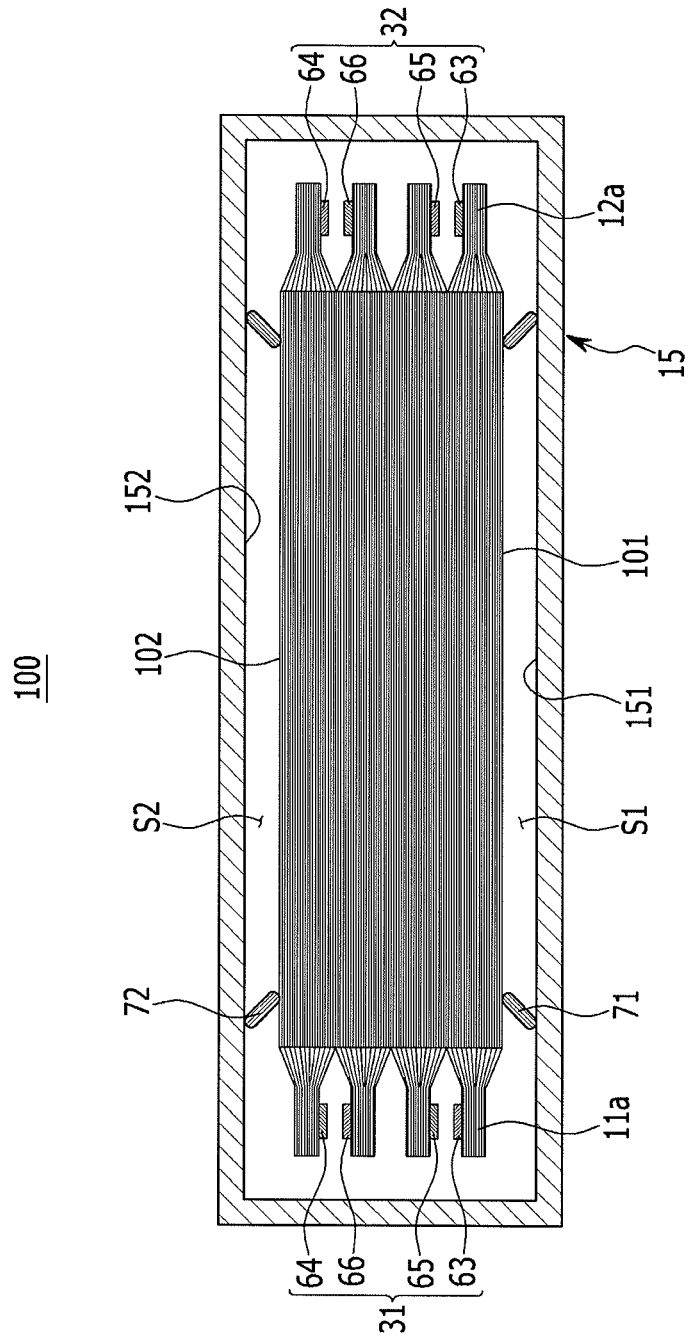
FIG. 5 illustrates a cross-sectional view taken along line V-V of FIG. 1.

FIG. 5 illustrates a cross-sectional view taken along line V-V of FIG. 1. Referring to FIGS. 2 and 5, elastic members 71 and 72 may be disposed in respective spaces S1 and S2 between the case 15 and the electrode assemblies 10. Although not illustrated, in an implementation, the elastic members 71 and 72 may be disposed between the respective electrode assemblies 10. As illustrated in FIG. 5, the elastic members 71 and 72 may be disposed at an outside from among the plurality of electrode assemblies 10 and an inside of the case 15 and may elastically support the electrode assemblies 10. For example, the elastic members 71 and 72 may be between the case 15 and an outer surface of the electrode assembly 10.

The elastic members 71 and 72 may support the electrode assemblies 10 at a predetermined pressure by pressing against the case 15 (due to self-elasticity characteristics of the elastic members 71 and 72) before the rechargeable battery 100 is first used. Accordingly, gaps between the negative electrode 11, the separator 13, and the positive electrode 12 may be maintained within a predetermined range. Thus, when the rechargeable battery 100 is first used, generation of gas and cell swelling may be suppressed.

The elastic members 71 and 72 may be disposed at outer areas within the spaces S1 and S2 between the electrode assemblies 10 and the case 15 and may support the electrode assemblies 10. Accordingly, the elastic members 71 and 72 may distribute expansion force (generated at a central portion of the electrode assemblies 10 while the rechargeable battery 100 is used) to the outside of the case 15.

In terms of the structure, the case 15 may have the greatest mechanical stiffness at outer areas thereof. The elastic members 71 and 72 may support the outer areas of the electrode assemblies 10. Thus, cell swelling may be effectively prevented.

As illustrated in the drawing figures, the case 15 may have a cuboid form and thus may have first and second inner faces or surfaces 151 and 152 (e.g., two faces having a wide rectangular area from among the six faces). The electrode assemblies 10 may be defined in portions other than the uncoated portions 11a and 12a, and may include first and second outer faces or surfaces 101 and 102 corresponding to the first and second inner faces 151 and 152. The first and second outer faces 101 and 102 may be the outermost faces disposed at the outside of the plurality of electrode assemblies 10, and may be on both sides of one electrode assembly 10 (not shown).

The elastic members 71 and 72 may be between the first and second inner faces 151 and 152 and the outsides of the first and second outer faces 101 and 102 in the respective spaces S1 and S2. In an implementation, the elastic members 71 and 72 may be made of, e.g., stainless steel or a copper alloy. The elastic member 71 between the first inner face 151 and the first outer face 101 in the space S1 is exemplarily described, for convenience of description.

Figure 6:
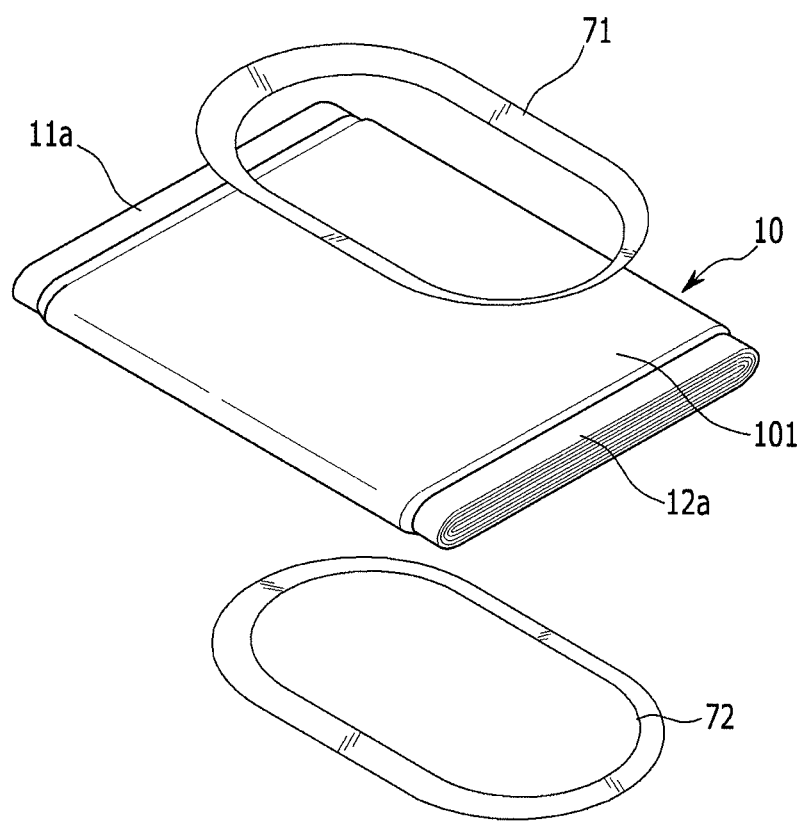
FIG. 6 illustrates an exploded perspective view of the electrode assembly and elastic members of FIG. 3.
Figure 7:
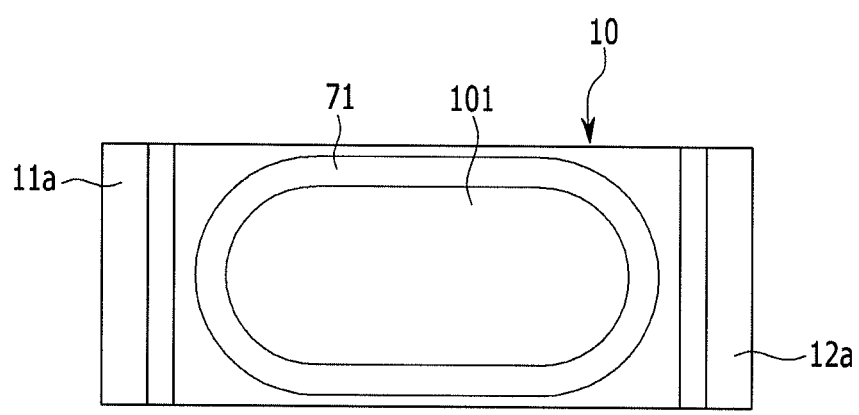
FIG. 7 illustrates a top plan view of FIG. 6.

FIG. 6 illustrates an exploded perspective view of the electrode assembly and the elastic members of FIG. 3. FIG. 7 illustrates a top plan view of FIG. 6. Referring to FIGS. 6 and 7, in an implementation, the elastic members 71 and 72 may be formed of Belleville springs. For example, each of the elastic members 71 and 72 may be formed by forming a belt, forming a closed curve having a predetermined width, in a plate form. In an implementation, the elastic members 71 and 72 may include a tapering wall defining a central open area having an axis, the tapering wall having an inclined disposition relative to the axis of the central open area. The elastic members 71 and 72 may have a loop structure surrounding the central open area. The loop structure may be a closed loop structure. In an implementation, the central open area may have a prismatic shape with rounded corners. In another implementation, the central open area may have a rounded shape. The elastic members 71 and 72 may be elastically biased toward the electrode assembly 10. The elastic members 71 and 72 may have a truncated conical shape formed by the tapering wall. The wall may have one axial end defining a first circumference and another axial end defining a second circumference; and the first circumference may be different from the second circumference. In an implementation, the wall may taper inwardly from the case to the electrode assembly 10.

The elastic member 71 may correspond to outer areas of the first inner face 151 and the first outer face 101 in the space S1. For example, the elastic member 71 may be formed of half circles of a belt form on the short sides of the first outer face 101 of the electrode assembly 10 and of straight lines of a belt form connecting both sides of the half circles on the long side thereof. For example, the central open area may be defined by edges of the wall, the edges of the wall including a pair of curved sections having concavities facing one another, and a pair of straight sections connecting ends of the curved sections.

Figure 8:
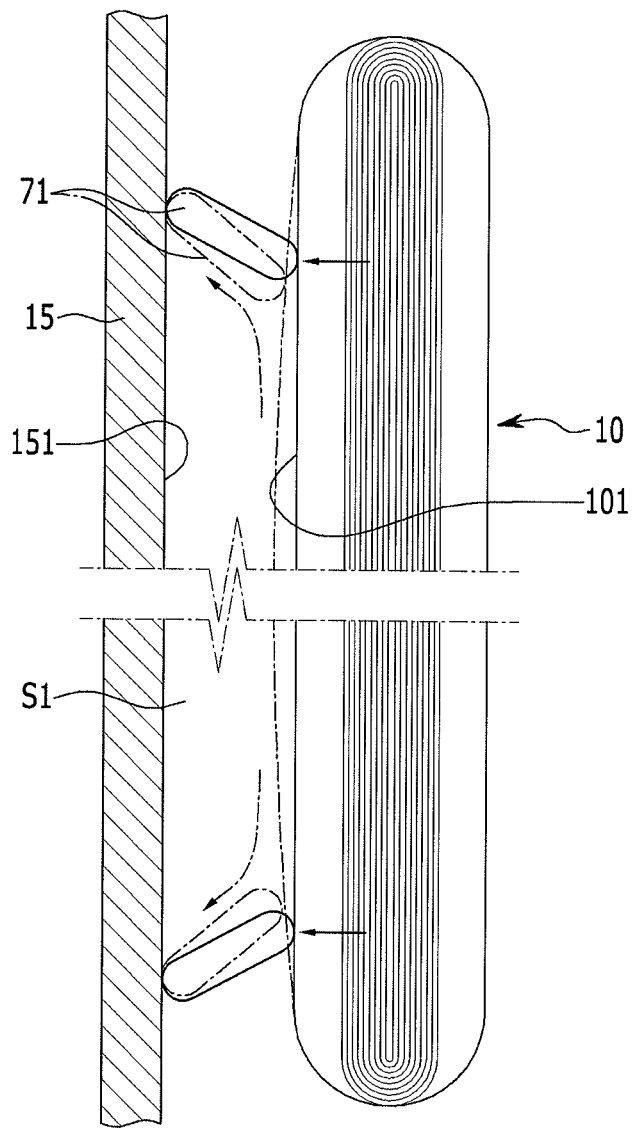
FIG. 8 illustrates a cross-sectional view showing operation of the elastic members between the electrode assembly and a case.

FIG. 8 illustrates a cross-sectional view showing operation of the elastic members between the electrode assembly and the casing. Referring to FIG. 8, the elastic member 71 may be supported by the first inner face 151 in response to expansion (e.g., imaginary line state) of the electrode assembly 10 and may be configured to slide and move (e.g., imaginary line state) from the outer areas of the first outer face 101 of the electrode assembly 10 to a center thereof, thereby absorbing and transferring the expansion force of the electrode assembly 10. For example, the tapering wall may be movable between relatively relaxed and relatively compressed positions, a degree of incline of the tapering wall relative to the axis of the central open area being greater in the relatively compressed positing than in the relatively relaxed position.

For example, the elastic member 71 may receive expansion force generated at the center of the electrode assembly 10 (while the rechargeable battery 100 is used) through the half circle and straight line forms. The elastic member 71 may uniformly distribute the received expansion force to the long and short sides of the first inner wall 151 that are the outer areas of the case 15 (refer to the imaginary line arrow).

A portion having the greatest mechanical stiffness in the case 15 is the outer areas. The greatest expansion force generated at the central portion of the electrode assembly 10 may be distributed to the outer areas of the case 15. Accordingly, cell swelling may be effectively suppressed. Even after the rechargeable battery 100 is used for a predetermined time, gaps between the negative electrode 11, the separator 13, and the positive electrode 12 of the electrode assembly 10 may be maintained within a predetermined range.

Hereinafter, another embodiment is described. A description of the same construction as that of the previous embodiment and the present embodiment is omitted for simplicity.

Figure 9:
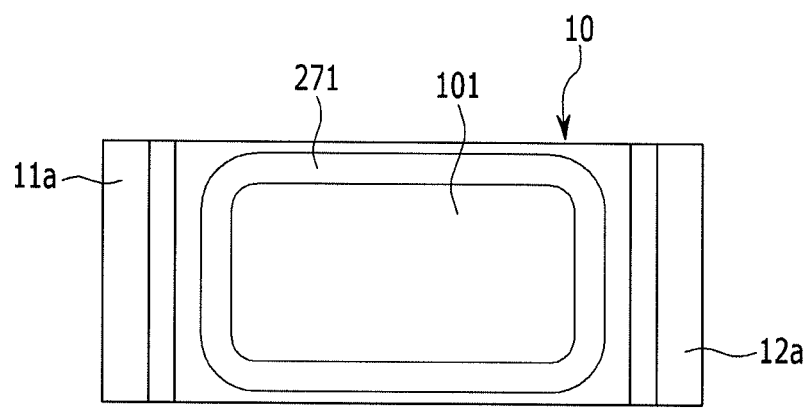
FIG. 9 illustrates a top plan view showing an arrangement relationship of an electrode assembly and an elastic member in a rechargeable battery according to another embodiment.

FIG. 9 illustrates a top plan view showing an arrangement relationship of an electrode assembly and an elastic member in a rechargeable battery according to another embodiment. Referring to FIG. 9, the rechargeable battery 200 of the present embodiment may include an elastic member 271 in which a portion connecting the long and short sides of the first outer face 101 in the electrode assembly 10 forms a ¼ circle of a belt form, and a straight line of a belt form connects the ¼ circles along the long and short sides of the first outer face 101. For example, the central open area may be defined by edges of the wall, the edges of the wall including four quarter circle sections and straight sections connecting ends of the quarter circle sections.

Accordingly, the elastic member 271 may receive expansion force generated at the center of the electrode assembly 10 (while the rechargeable battery 200 is used) through the ¼ circle and straight line forms. Thus, the elastic member 271 may uniformly distribute the received expansion force to the long and short sides of the first inner wall 151 which correspond to the outer areas of the case 15 (refer to the imaginary line arrow).

In the elastic member 271 of the present embodiment, the ¼ circles may be connected by the straight line. Accordingly, the expansion force of the electrode assembly 10 may be further transferred and distributed to the outer areas of the case 15. The first elastic member 271 of the present embodiment may be advantageous in terms of cell swelling suppression.

Figure 10:
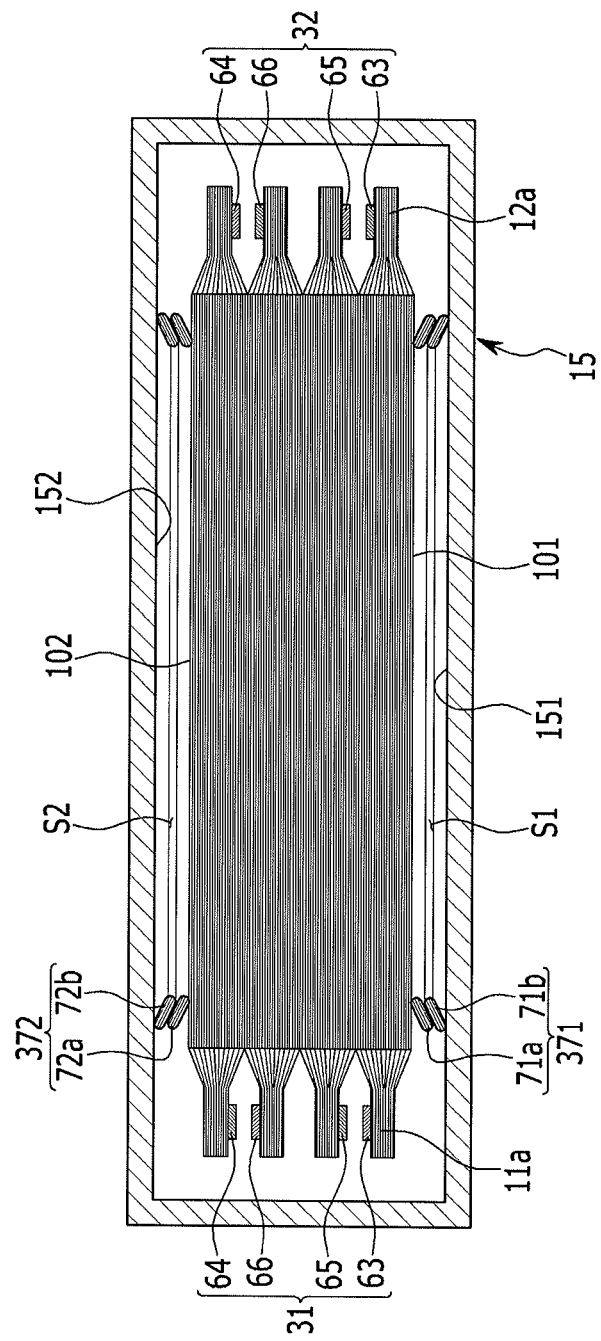
FIG. 10 illustrates a cross-sectional view of a rechargeable battery according to yet another embodiment.

FIG. 10 illustrates a cross-sectional view of a rechargeable battery 300 according to yet another embodiment. Referring to FIG. 10, in the rechargeable battery 300 of the present embodiment, each of elastic members 371 and 372 may be formed of two plate springs. For example, the elastic members 371 and 372 may include respective inside elastic members 71a and 72a and respective outside elastic members 71b and 72b that are disposed in a surface contact structure. For example, the elastic members 371 and 372 may include an inside elastic member 71a, 72a and an outside elastic member 71b, 72b, the inside elastic member 71a, 72a being between the outside elastic member and the electrode assembly 10, the outside elastic member 71b, 72b being between the case 15 and the inside elastic member 71a, 72a, and the plurality of elastic members 371 and 372 being stacked in a surface contact configuration such that the tapering walls thereof taper in the same direction.

The inside elastic members 71a and 72a may correspond to the first and second outer faces 101 and 102 of the electrode assemblies 10, respectively, in spaces S1 and S2. The outside elastic members 71b and 72b may correspond to the first and second inner faces 151 and 152 of a case 15, respectively, in the spaces S1 and S2.

Accordingly, the expansion force of the first and second outer faces 101 and 102 of the electrode assemblies 10 may be transferred to the inside elastic members 71a and 72a. Then, the expansion force may be transferred to the first and second inner faces 151 and 152 of the case 15 through the outside elastic members 71b and 72b.

The elastic members 371 and 372 of the present embodiment may be formed of the two plate springs. Accordingly, reliability in which the expansion force of the electrode assemblies 10 is transferred and distributed to the case 15 may be improved.

Figure 11:
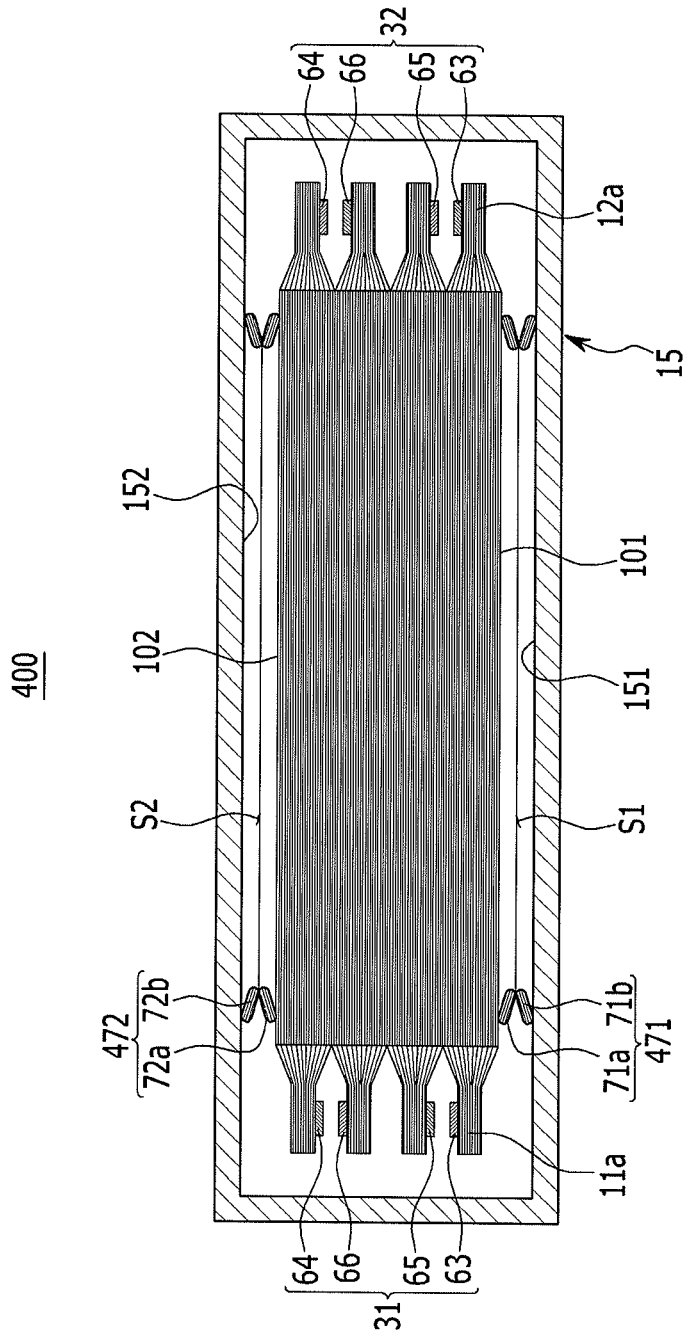
FIG. 11 illustrates a cross-sectional view of a rechargeable battery according to still another embodiment.

FIG. 11 illustrates a cross-sectional view of a rechargeable battery 400 according to still another embodiment. Referring to FIG. 11, in the rechargeable battery 400 of the present embodiment, each of elastic members 471 and 472 may be formed of two plate springs. The elastic members 471 and 472 may include respective inside elastic members 71a and 72a and respective outside elastic members 71b and 72b that are disposed in a line contact structure. For example, the elastic members 471 and 472 may include an inside elastic member 71a, 72a and an outside elastic member 71b, 72b, the inside elastic member 71a, 72a being between the outside elastic member 71b, 72b and the electrode assembly, the outside elastic member 71b, 72b being between the case 15 and the inside elastic member 71a, 72a, and the plurality of elastic members 471 and 472 being stacked in a line contact configuration such that the tapering walls thereof taper in opposite directions.

The inside elastic members 71a and 72a may correspond to the first and second outer faces 101 and 102 of the electrode assemblies 10, respectively, in spaces S1 and S2. The outside elastic members 71b and 72b may correspond to the first and second inner faces 151 and 152 of the casing 15, respectively, in the spaces S1 and S2.

Accordingly, the expansion force of the first and second outer faces 101 and 102 of the electrode assemblies 10 may be transferred to the inside elastic members 71a and 72a. Then, the expansion force may be transferred and distributed to the first and second inner faces 151 and 152 of the case 15 through the outside elastic members 71b and 72b.

The elastic members 471 and 472 of the present embodiment may be disposed in the line contact structure and may be mutually elastically supported. Accordingly, the expansion force of the electrode assemblies 10 may be mitigated and absorbed between the inside elastic members 71a and 72a and the outside elastic members 71b and 72b before the expansion force is transferred and distributed to the case 15.

Figure 12:
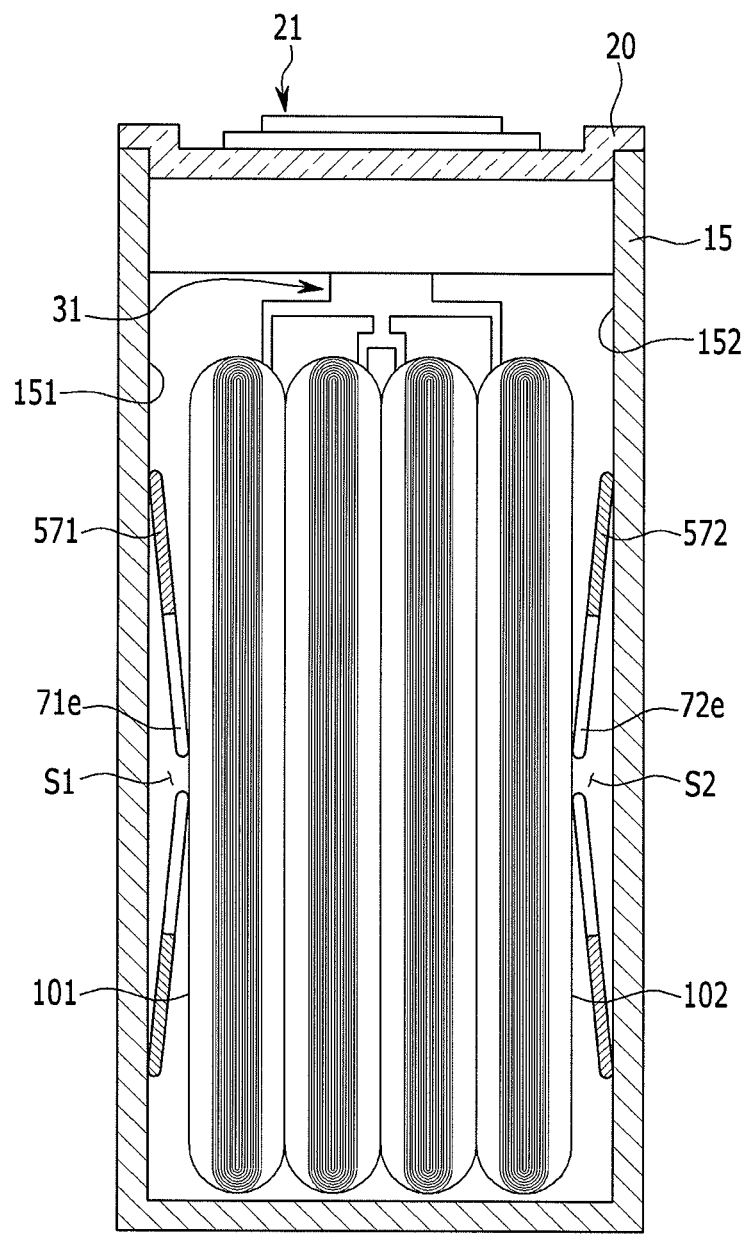
FIG. 12 illustrates a cross-sectional view of a rechargeable battery according still another embodiment.
Figure 13:
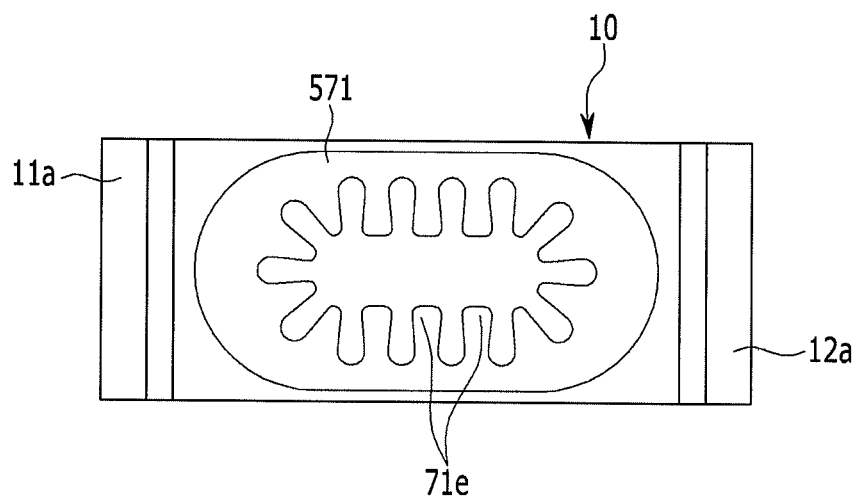
FIG. 13 illustrates a lateral view showing an arrangement of an electrode assembly and an elastic member shown in FIG. 12.

FIG. 12 illustrates a cross-sectional view of a rechargeable battery 500 according to still another embodiment. FIG. 13 illustrates a lateral view showing the arrangement of an electrode assembly and an elastic member shown in FIG. 12.

Referring to FIGS. 11 and 12, in the rechargeable battery 500 according to the present embodiment, elastic members 571 and 572 may be formed of respective slotted disk springs. For example, the central open area may have an oblong shape with rounded ends and with outwardly extending, finger-like projections.

The elastic members 571 and 572 may correspond to the first and second outer faces 101 and 102 of electrode assemblies 10, respectively, and to the first and second inner faces 151 and 152 of the case 15, respectively, in respective spaces S1 and S2. In an implementation, extension units 71e and 72e extended from the elastic members 571 and 572 to the center of the rechargeable battery 500 may support the central portions of the first and second outer faces 101 and 102 of the electrode assemblies 10.

Accordingly, the expansion force of the first and second outer faces 101 and 102 of the electrode assemblies 10 may be transferred to the inside elastic members 571 and 572. Then, the expansion force may be transferred and distributed to the first and second inner faces 151 and 152 of the case 15.

Thus, the extension units 71e and 72e may support the central potion of the electrode assemblies 10 at which the expansion force is a maximum. Accordingly, the expansion force of the central portion may be distributed to the outer areas of the electrode assemblies 10 and simultaneously transferred and distributed to the outer areas of the casing 15.

The elastic members 571 and 572 of the present embodiment may be formed of the slotted disk springs and configured to contact or press the central portion of the electrode assemblies 10. Accordingly, expansion force generated at the central portion of the electrode assemblies 10 may be distributed to the outer areas of the electrode assemblies 10 and simultaneously transferred and distributed to the outer areas of the case 15.

As described above, charging and discharging may be repeated in the electrode assembly. Thus, excessive heat may be generated and an electrolyte solution may be decomposed. Accordingly, intervals between the positive electrode, the separator, and the negative electrode may be widened; and the electrode assembly may swell, thereby resulting in cell swelling.

The embodiments provide a rechargeable battery that suppresses swelling of an electrode assembly by maintaining gaps between a positive electrode, a separator, and a negative electrode within a predetermined range.

The embodiments provide a rechargeable battery that suppresses cell swelling by suppressing the generation of gas when the battery is first used.

In accordance with an embodiment, the elastic members may be disposed in the space between the electrode assembly and the case, and the electrode assembly is supported at a predetermined pressure by means of reaction force of the case. Accordingly, there is an advantage in that the gap between the positive electrode, the separator, and the negative electrode may be maintained within a predetermined range from the first time when the battery is used. The elastic members may be disposed outside of the space between the electrode assembly and the case, and thus expansion force generated at a central portion of the electrode assembly may be distributed outside the case. Accordingly, even after a predetermined time, the gap between the positive electrode, the separator, and the negative electrode may be maintained within a predetermined range. Accordingly, the swelling of the electrode assembly and cell swelling may be prevented.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present invention as set forth in the following claims.

What is claimed is:

1. A rechargeable battery, comprising:
   an electrode assembly;
   a case accommodating the electrode assembly; and
   an elastic member between the case and an outer surface of the electrode assembly, wherein the elastic member includes a tapering wall defining a central open area having an axis, the tapering wall having an inclined disposition relative to the axis of the central open area,
   wherein:
   the electrode assembly includes a positive electrode, a negative electrode, and a separator wound in a jelly roll structure around an axis of the electrode assembly, and
   the axis of the central open area is perpendicular to the axis of the electrode assembly.

2. The rechargeable battery as claimed in claim 1, wherein the elastic member has a loop structure surrounding the central open area.

3. The rechargeable battery as claimed in claim 2, wherein the loop structure is a closed loop structure.

4. The rechargeable battery as claimed in claim 2, wherein the central open area has a prismatic shape with rounded corners.

5. The rechargeable battery as claimed in claim 2, wherein the central open area has an oblong shape with rounded ends and with outwardly extending, finger-like projections.

6. The rechargeable battery as claimed in claim 2, wherein the central open area has a rounded shape.

7. The rechargeable battery as claimed in claim 1, wherein the central open area is defined by edges of the wall, the edges of the wall including:
- a pair of curved sections having concavities facing one another, and
- a pair of straight sections connecting ends of the curved sections.

8. The rechargeable battery as claimed in claim 1, wherein the central open area is defined by edges of the wall, the edges of the wall including:
- four quarter circle sections, and
- straight sections connecting ends of the quarter circle sections.

9. The rechargeable battery as claimed in claim 1, wherein the rechargeable battery includes a plurality of the elastic members between the outer surface of the electrode assembly and the case.

10. The rechargeable battery as claimed in claim 9, wherein the plurality of elastic members includes an inside elastic member and an outside elastic member, the inside elastic member being between the outside elastic member and the electrode assembly, the outside elastic member being between the case and the inside elastic member, and the plurality of elastic members being stacked in a surface contact configuration such that the tapering walls thereof taper in the same direction.

11. The rechargeable battery as claimed in claim 9, wherein the plurality of elastic members includes an inside elastic member and an outside elastic member, the inside elastic member being between the outside elastic member and the electrode assembly, the outside elastic member being between the case and the inside elastic member, and the plurality of elastic members being stacked in a line contact configuration such that the tapering walls thereof taper in opposite directions.

12. The rechargeable battery as claimed in claim 1, wherein the elastic member is elastically biased toward the electrode assembly.

13. The rechargeable battery as claimed in claim 1, wherein the elastic member has a truncated conical shape formed by the tapering wall.

14. The rechargeable battery as claimed in claim 1, wherein the wall has one axial end defining a first circumference and another axial end defining a second circumference, the first circumference being different from the second circumference.

15. The rechargeable battery as claimed in claim 1, wherein the wall tapers inwardly from the case to the electrode assembly.

16. The rechargeable battery as claimed in claim 1, wherein the tapering wall is movable between a relatively relaxed position and a relatively compressed position, a degree of incline of the tapering wall relative to the axis of the central open area being greater in the relatively compressed position than in the relatively relaxed position.

17. The rechargeable battery as claimed in claim 1, wherein the central open area is further defined by an inner face of the case and an outer face of the electrode assembly.

18. The rechargeable battery as claimed in claim 1, wherein the elastic member includes a plate spring.

\* \* \* \* \*